(No Model.) 2 Sheets—Sheet 1.
M. PÜSCHNER.
SAW SETTING MACHINE.
No. 403,212. Patented May 14, 1889.
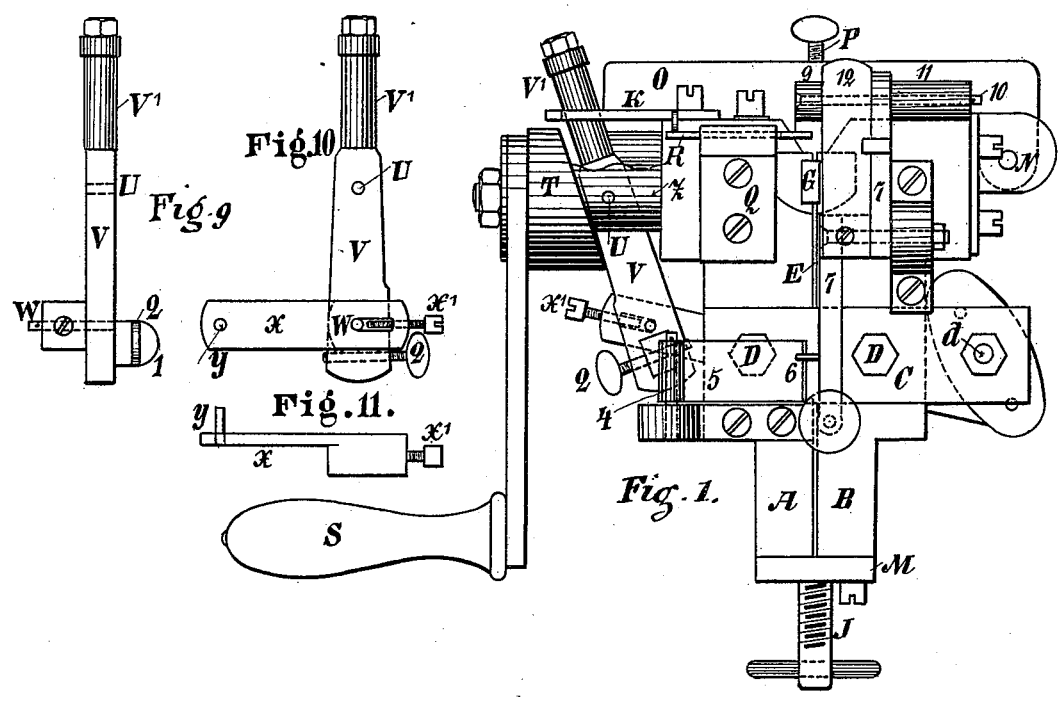
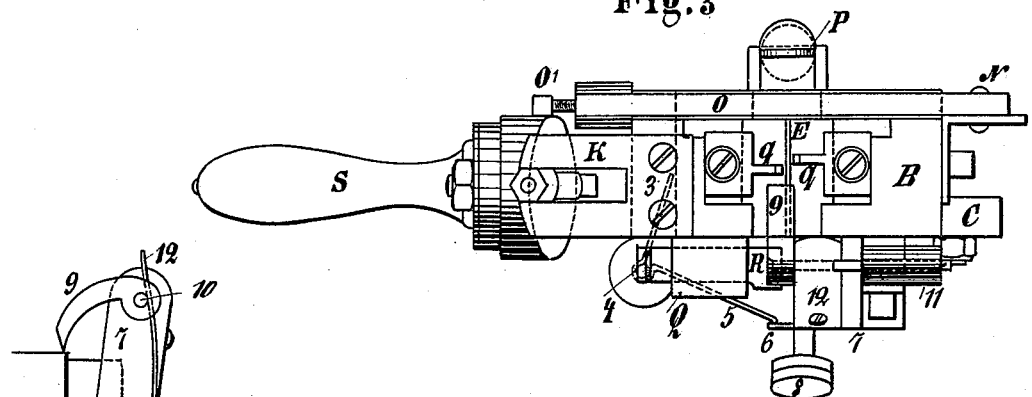
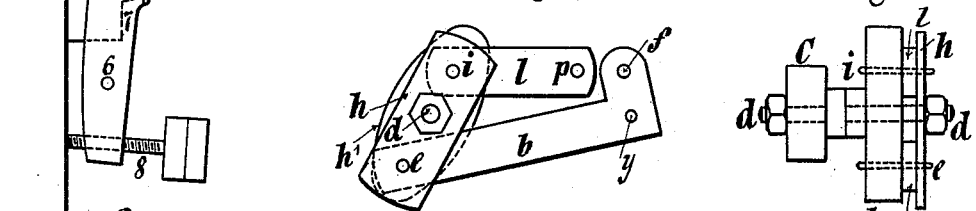
Witnesses.
A. Jonghmans
Wm Wagner
Inventor.
Moritz Püschner
per Rauder & Brün
Attorneys (No Model.) 2 Sheets—Sheet 2.

M. PÜSCHNER.
SAW SETTING MACHINE.

No. 403,212. Patented May 14, 1889.

Witnesses. Inventor.

UNITED STATES PATENT OFFICE.

MORITZ PÜSCHNER, OF GÖRLITZ, PRUSSIA, GERMANY.

SAW-SETTING MACHINE.

SPECIFICATION forming part of Letters Patent No. 403,212, dated May 14, 1889.

Application filed March 13, 1889. Serial No. 303,148. (No model.) Patented in Germany August 7, 1888, No. 46,345.

*To all whom it may concern:*

Be it known that I, MORITZ PÜSCHNER, a subject of the King of Prussia, residing at Görlitz, in the Kingdom of Prussia, Germany, have invented certain new and useful Improvements in Teeth-Setting Machines for Saws, (patented in Germany August 7, 1888, No. 46,345,) of which the following is a specification.

In order to saw wood, especially when it is fresh or moist, it is necessary that the teeth of a saw are set to enable the sawdust to be removed properly by the saw. To set the teeth, at present only tools have been applied; but with these one could never set properly at all times one tooth exactly like the other. By the machine in question the teeth of a saw will be set positively equal and self-acting, and of both sides each time two teeth are set.

The single parts of the machine may be adjusted easily to fit any breadth of the saw and any pitch.

Figure 2:
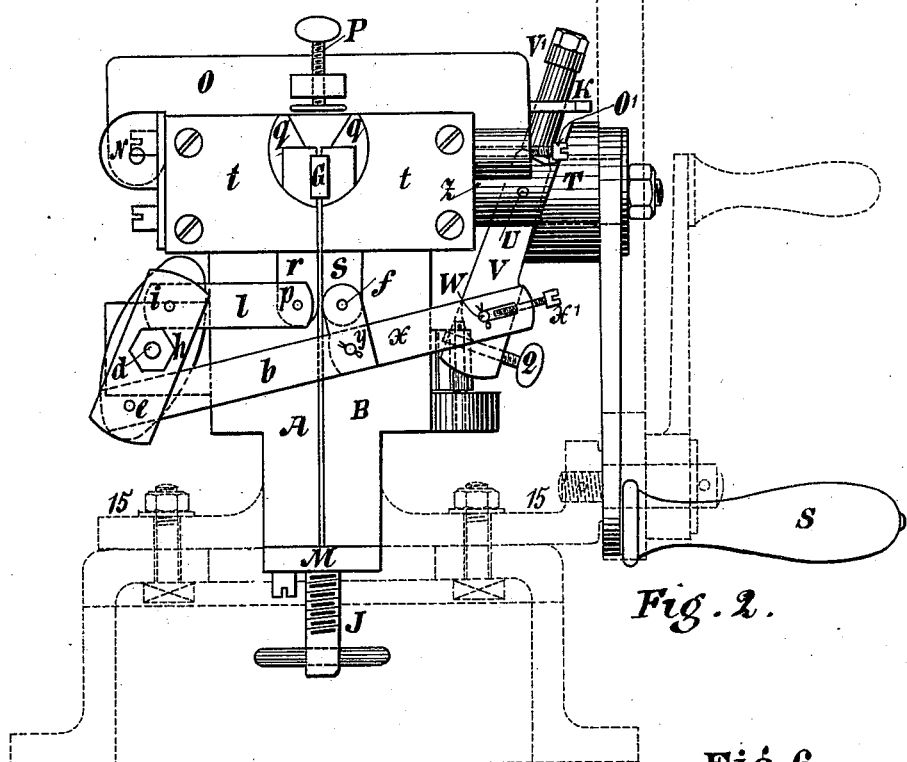
Figures 4, 5:
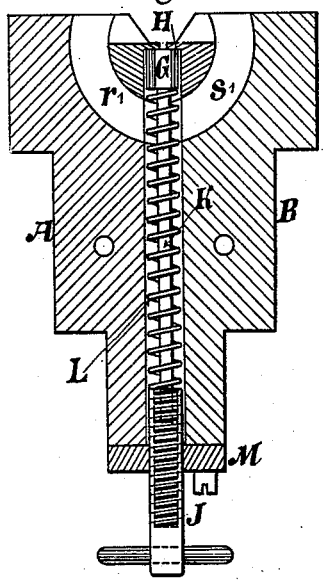
Figures 6, 7, 8:
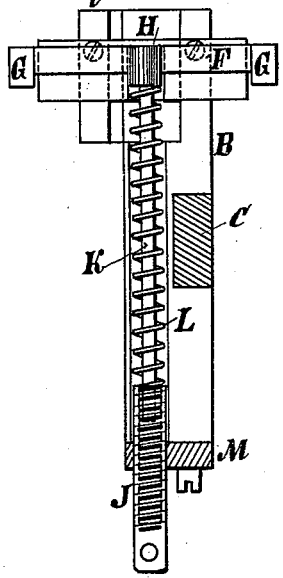

In the accompanying drawings, Figure 1 is a front view of the machine. Fig. 2 is a rear view of the machine. Fig. 3 is a plan of the same. Fig. 4 is a vertical lateral section without the setting-tool. Fig. 5 is a vertical cross-section through the center of Fig. 4. Fig. 6 is a top view of Figs. 4 and 5; Figs. 7 and 8, the side and front view of a setting-tool bearer with setting-tool; Figs. 9, 10, and 11, the front and side views and plan of the oscillating lever for motion; Fig. 12, a side view of the ratchet-lever for the motion of the saw; Figs. 13 and 14, the side and front view of the combined levers which transmit and adjust the motion of the setting-tools.

This tooth-setting machine consists of two frames, A and B, which are united together by the bar C, inserted into the frames and secured by screws D in such a manner that a narrow space, E, remains between the frames A and B, into which, at the upper part, the saw to be set will be put upon the thin guide-plate F, provided with broad handle G at its ends, Figs. 5 and 6. This guide-plate F rests near its center in the round head H of the round bar K, which extends downward into the hollow screw J, and is surrounded by a spiral spring, L. The spiral spring L may be given more or less tension by means of the hollow screw I, which runs through the cap M, fastened by screws to frame B. In order to put in the saw, the side handle or bar, O, turning upon the pivot N, is turned upward, when the saw can be placed into the space E, after which said handle or bar O is moved back again into its place and secured to the plate *t* of the machine by the screw O'. This handle or bar O has on one side near its middle an adjusting-screw, P, with a round plate at its lower end, beneath which graze the saw-teeth.

To the frame A an angle-iron, Q, is fastened on the part opposite to the adjusting-screw P, in which, by means of a handle, the sheet R may be moved to and fro. When the saw is in the slit E, the sheet R will be moved over it, so that the saw-teeth graze beneath it. By this arrangement the bottom of the saw will be guided in the slit E upon the guide-sheet F and the top of the saw by the sheet R and the round plate of the adjusting-screw P.

The mechanism to set the teeth and to move the saw consists of the winch-crank S, which turns loosely upon the stud Z, attached to the frame A. The interior part of the hub of the lever S forms an oblique plane, T, near which the motion-lever V is situated. This lever V is passed through a slit in the stud Z and turns upon the pivot U, and oscillates to and fro by the turning of the handle S on account of the oblique surface T of the hub. On the lower part of the handle V a pin, W, projects, which is connected through a slit with adjusting-screw X' of the lever X. (See Figs. 2, 9, 10, and 11.) This lever X has at its other end a pin, *y*, to which the angle-lever *b*, Figs. 2, 13, and 14, is fastened. The upper arm of this lever is connected by a pin, *f*, with one of the setting-tool bearers, *s*, while the other arm of said lever *b* is connected through pin *e* with a lever, *h*, turning upon the pivot *d*. The other end of the lever *h* is connected through pin *i* with a lever, *l*, connected through pin *p* with the other setting-tool bearer, *r*, so that by moving the handle V both of the setting-tool bearers *r* and *s* are drawn to and fro and the setting-tools attached to them are moved in a peculiar way, by which two teeth are set by each rotation. The setting-tool bearers *r* and s, of which one of them is represented by Figs. 7 and 8, have circular surfaces which move in circular furrows $r'$ and $s'$, Figs. 4 and 6, of the frames A and B, so that by turning the handle V the setting-tools $q$ receive a revolving and at the same time sliding motion. In consequence of this motion the upper parts of this oblique cut hub of the setting-tools $q$ incline forward, when turning inward, and put aside the teeth of the saw. The setting-tool bearers $r\ s$, fixed sidewise to the frames A B, are kept in their position by the plate $t$, screwed to the frames A B, Figs. 2 and 6. The setting-tools $q$, screwed on the setting-tool bearers $r\ s$, have slits to shift them aside and to fix them according to the pitch of the teeth of the saw. The position of the tool may be regulated by the adjusting-screw $x'$ in the slit of the lever $x$. To the plate C a bolt, $d$, is attached, carrying a plate, $h'$, Figs. 13 and 14, and supporting the lever $h$, and so arranged that the levers $b$ and $l$, turning on the pivots $e$ and $i$, are placed between lever $h$ and plate $h'$. The lever V is provided above the stud Z with a loose sleeve, V', which works in a slot in the plate K, attached to the frame A.

The medium of moving or shifting the saw forward is the adjusting-screw 2 screwed to the angle-piece 1 of the lever V. By moving this screw 2 inward of the lever V the same presses against an arm, 3, of an angle-lever turning on the pivot 4, while the other arm, 5, of said lever presses against a pin, 6, attached to an oscillating lever, 7, which, with its adjusting-screw 8, lies close against the frame. This lever 7 has at its upper part a latch, 9, Fig. 12, which gears together the teeth of the saw, whereby at every rotation of the handle the saw is moved on for two teeth. The amount of motion may be regulated by the adjusting-screws 2 and 8, according to the pitch of the teeth of the saw. The latch 9 is fastened to the long pin 10, between which and the guiding part 11 the spring 12 is placed. When the saw is to be taken away and another one substituted, the spring 12 and latch 9 have to be moved away.

The machine, as described, is fastened into a vise or upon a planing-bench at the lower under parts of the frames A B. For very large saws the lower parts of the frames A B may be provided with cast flanges 15, as shown in dotted lines in Fig. 2, and attached to a suitable frame.

Instead of the handle S a gear-wheel having the oblique-shaped hub T may be placed upon the bolt Z and operated by a pinion, to which a handle is fastened, as shown in dotted lines in Fig. 2.

What I claim is—

1. In machines for setting teeth of saws, the combination of the frames A B, joined together by bar C, leaving a space, E, between said frames, the handle S, turning loosely on stud Z, provided with a hub having at its end the oblique plane T, the lever V, levers $x, b, h$, and $l$, with the setting-tool bearers $r$ and $s$, and setting-tools $q$, substantially as specified.

2. In machines for setting teeth of saws, the combination of frames A, connected together to leave space E, with plate F, bolt K, and hollow screw J, and with lever O, provided with screw P, substantially as specified.

3. In machines for setting teeth of saws, in combination with a lever, V, the screw 2, angle-levers 3 and 5, lever 7, with adjusting-screw 8 and pin or projection 6, and latch 9, as and for the purpose described.

In testimony whereof I hereunto sign my name, in the presence of two subscribing witnesses, this 25th day of February, 1889.

MORITZ PÜSCHNER.

Witnesses:
AUGUST HOFFMANN,
EMIL BECKER.